July 19, 1960 A. B. DAVENPORT 2,945,966
TRANSISTORIZED MONOSTABLE MULTIVIBRATOR
Filed March 22, 1957
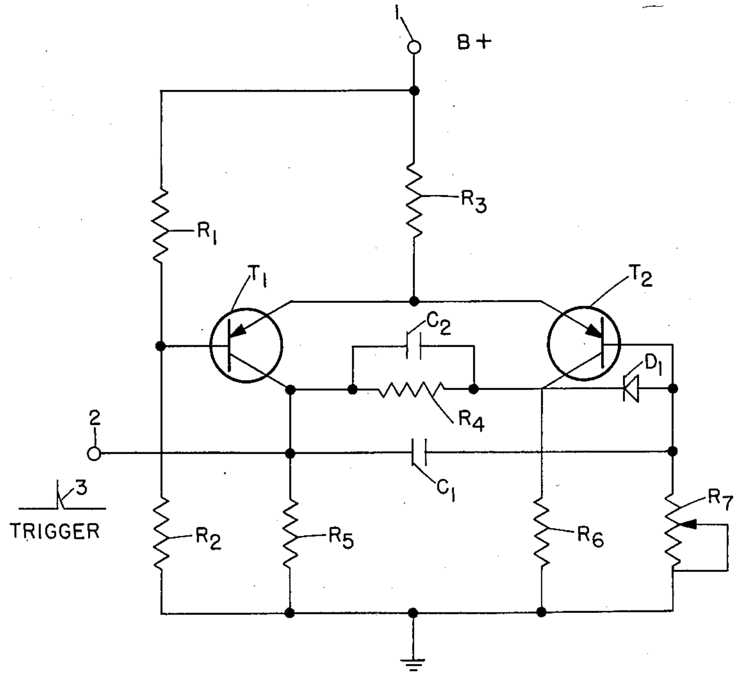
ARTHUR B. DAVENPORT
INVENTOR
BY Killman and Kerst
ATTORNEYS United States Patent Office 2,945,966

Patented July 19, 1960

2,945,966

TRANSISTORIZED MONOSTABLE MULTIVIBRATOR

Arthur Bruce Davenport, Owings Mills, Md., assignor to Bendix Aviation Corporation, Towson, Md., a corporation of Delaware Filed Mar. 22, 1957, Ser. No. 647,903

1 Claim. (Cl. 307—88.5)

This invention relates to monostable multivibrators and is directed to a reduction in the gain requirements of transistors employed in such circuits and an improvement in maximum limits of pulse durations which may be obtained.

In order for a monostable multivibrator to operate with an output which is stable and of predictable duration for a given bias setting, it is necessary that it operate in a saturated state. This requires high gain in the stages and, if transistors are used, requires expensive high gain types of transistors. If the gain of the transistors is too low, or the duration of the pulse too long, the multivibrator will become astable and free-running.

It is an object of this invention to provide a transistorized multivibrator circuit which may utilize low cost, low gain transistors and still operate in a stable and predictable manner.

It is a further object of the invention to provide a multivibrator circuit which will remain stable while producing output pulses of longer duration than could be stably produced by prior circuits.

These and other objects and advantages of the invention are realized by a circuit having a capacitive coupling between the output of the first stage and the input of the second, and a network shunting this coupling means, the network being composed of a series arrangement of a resistor and a diode, the resistor being shunted by a capacitor and the diode being poled to offer a low impedance to base current in the second stage.

The single figure of the drawing is a schematic diagram of a circuit embodying the invention.

In the drawing the multivibrator comprises a pair of transistors $T_1$ and $T_2$ indicated as being of the PNP junction type, with their emitters connected by way of a common resistor $R_3$ to a positive terminal 1 of a source of supply voltage indicated as B+. This terminal is connected to ground through a pair of serially connected resistors $R_1$ and $R_2$, the junction of which is connected to the base of $T_1$. The collectors of $T_1$ and $T_2$ are connected to ground through respective resistors $R_5$ and $R_6$. The collector of $T_1$ is coupled to the base of $T_2$ by a capacitor $C_1$. The base of $T_2$ is connected to ground through a variable resistor $R_7$. There is provided a terminal 2, connected to the collector of $T_1$, at which is applied to the multivibrator a series of positive-going triggering impulses indicated by the graph 3.

The portion of the circuit which has been described constitutes a monostable multivibrator in accordance with the prior art. In its operation the circuit is normally so biased by the voltage divider $R_1$, $R_2$ that the transistor $T_1$ is cut off, with the voltage at the base of $T_1$ somewhat positive with respect to that at its emitter. $T_2$ is conducting to saturation with the voltage at its emitter substantially equal to that at its collector and the voltage at its base negative with respect thereto.

The application of a triggering impulse 3 at terminal 2, causes the collector of $T_1$ to become more positive and the base of $T_2$ to do likewise. This reduces conduction in $T_2$, making the emitters of both $T_1$ and $T_2$ become more positive and initiating conduction in $T_1$. Conduction in transistor $T_1$ causes its collector to go more positive and the base of $T_2$ to follow. This regenerative action culminates in a complete reversal of the original conductive state, with $T_2$ entirely cut off and $T_1$ conducting to saturation. The voltage at the base of $T_2$ now begins to fall toward ground accompanied by current flow through $R_7$ and $R_5$. The setting of $R_7$ governs the rate of current flow and thus determines the pulse duration.

If the transistor $T_2$ is of relatively low gain the base bias current in $R_7$ may not allow enough collector-emitter current in $T_2$ to keep it in saturation with the result that the emitter potential will rise toward B+, become more positive than that at the base of $T_1$, and cause $T_1$ to start conducting. This will initiate a free-running condition of the multivibrator. This condition is most apt to occur when an output pulse of long duration is required and $R_7$ is increased in value to provide a long time constant $R_7$ $C_1$. This reduces the base current of $T_2$ to a value which will not keep $T_2$ saturated.

In accordance with the invention the collector of $T_1$ is connected by a resistor $R_4$ in series with a diode $D_1$ to the base of $T_2$. The resistor is shunted by a capacitor $C_2$. This causes an increase in $T_2$ base bias current due to direct current flow through $R_4$ and $R_5$ to ground. The resistance of $R_4$ is chosen to be small enough so that the base current of $T_2$ will always be sufficient to keep it saturated, regardless of the magnitude of resistor $R_7$.

During the timing interval of the multivibrator pulse the resistor $R_4$ is isolated from the $C_1$ $R_7$ timing function because the positive pulse appearing at the collector of $T_1$, acting through the capacitor $C_2$, causes the diode $D_1$ to be cut off. The $C_2$, $R_4$, $D_1$ network combination acts only during the quiescent state and thus does not load the timing network during the pulse.

What is claimed is:

In a monostable multivibrator comprising a pair of transistors each having an input circuit and an output circuit, regenerative feedback means coupling said transistors including, capacitive means coupling the output circuit of a first of said transistors to the input circuit of the second, resistive means providing a discharge path for said capacitive coupling means, means normally biasing said first transistor to cut-off, and means applying voltage impulses to said capacitive coupling means and said output circuit of said first transistor of a magnitude and polarity to reverse the quiescent conductive states of said transistors; the improvement which comprises: a network shunting said capacitive coupling means, said network comprising a series arrangement of a resistor and a diode, and a capacitor shunting said resistor.

References Cited in the file of this patent

UNITED STATES PATENTS

| | | |
|---|---|---|
| 2,533,001 | Eberhard | Dec. 5, 1950 |
| 2,622,212 | Anderson | Dec. 16, 1952 |
| 2,673,936 | Harris | Mar. 30, 1954 |
| 2,778,978 | Drew | Jan. 22, 1957 |
| 2,787,712 | Priebe | Apr. 2, 1957 |